Jan. 9, 1962 H. P. WILLINGHAM 3,015,903
SHRIMPING GEAR
Filed July 13, 1959 3 Sheets-Sheet 3
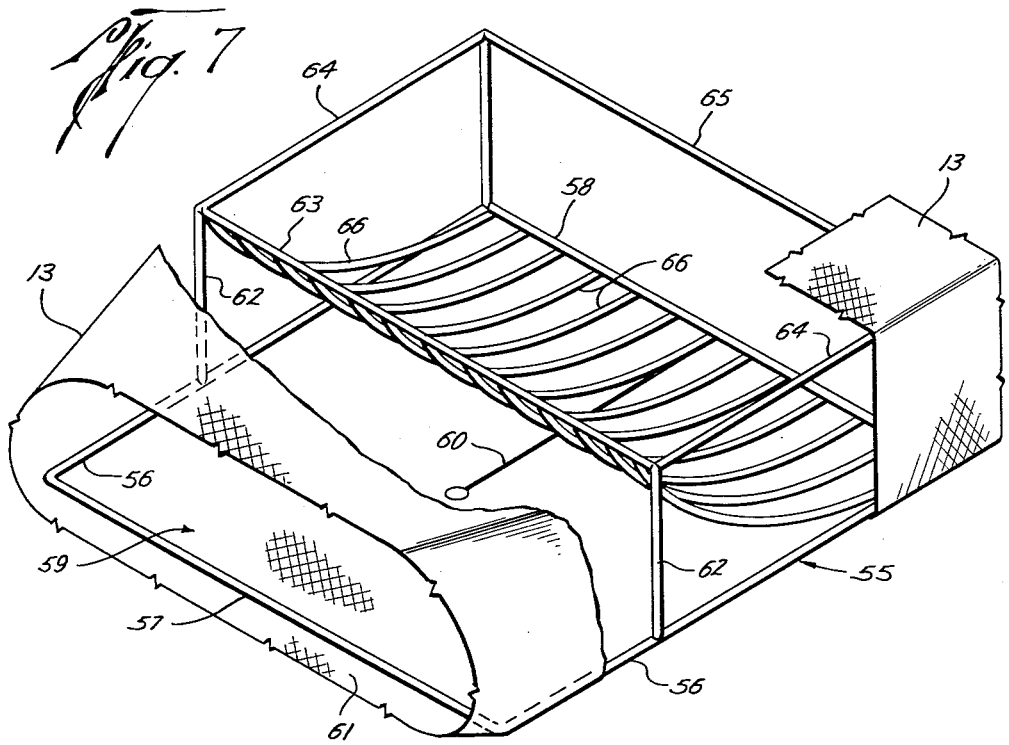
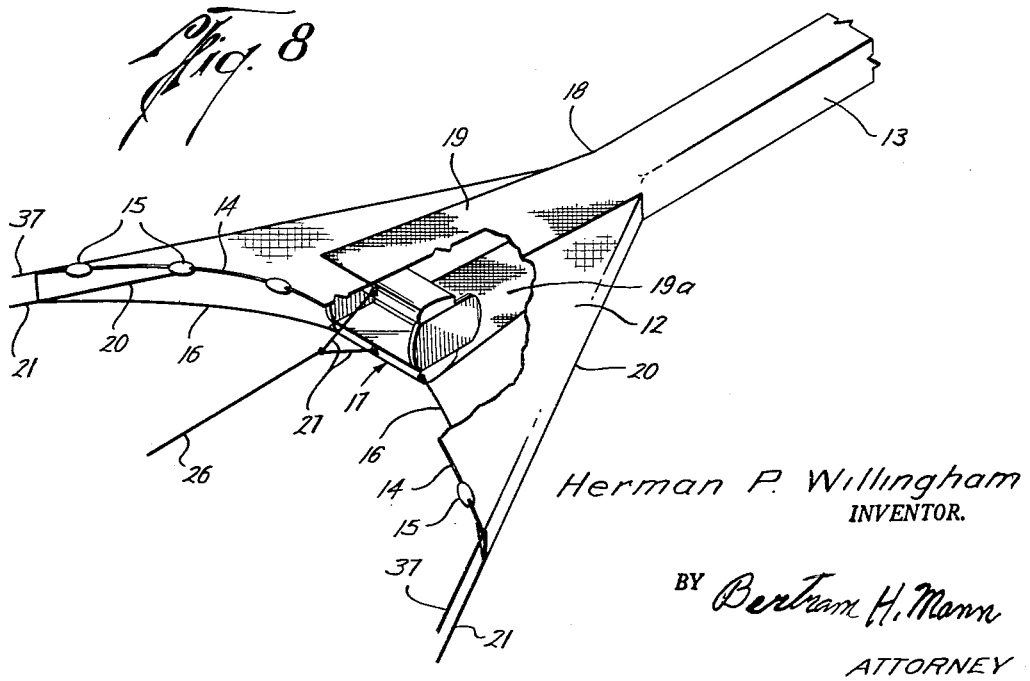
Herman P. Willingham
INVENTOR.
BY Bertram H. Mann
ATTORNEY United States Patent Office 3,015,903
Patented Jan. 9, 1962

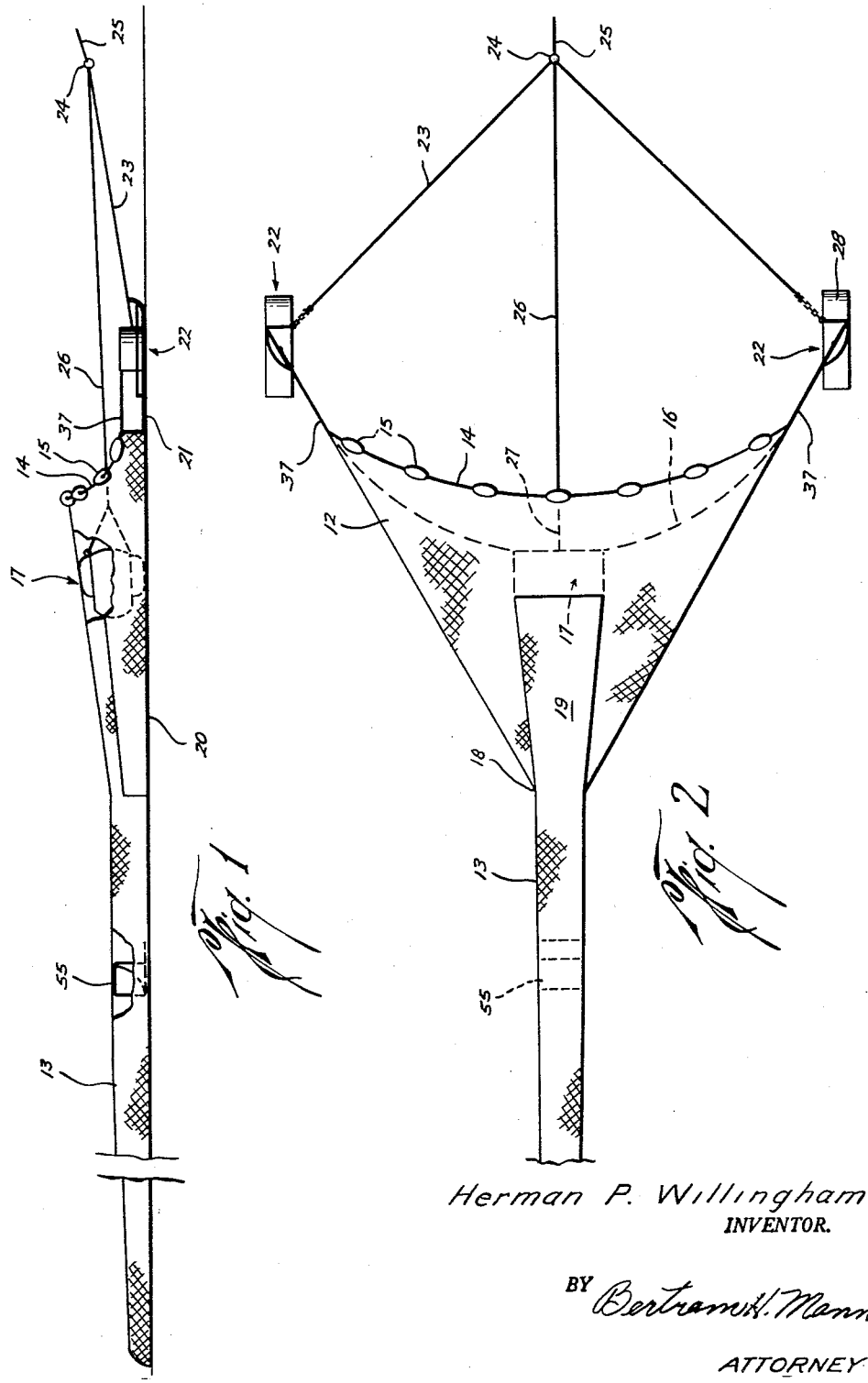

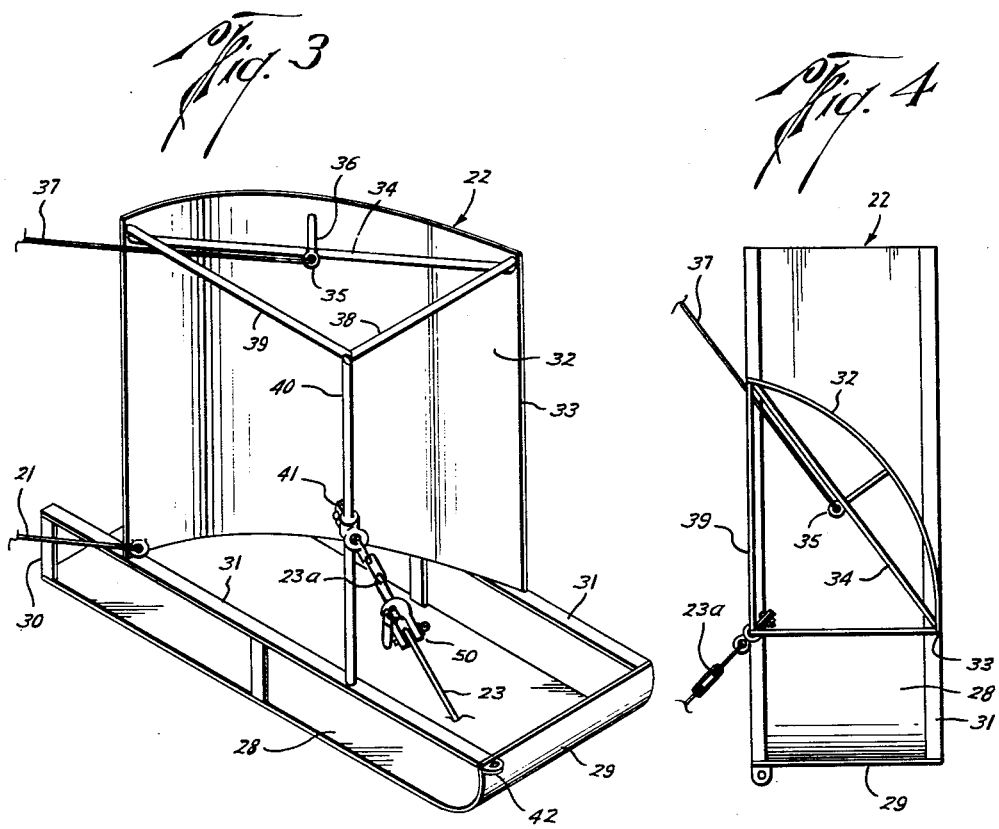
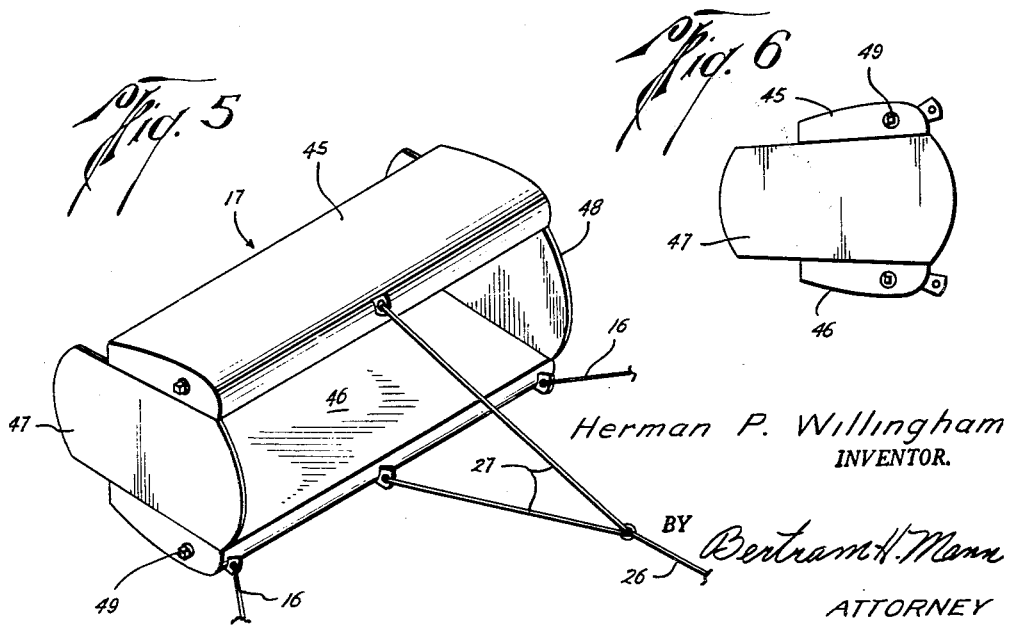

3,015,903
SHRIMPING GEAR
Herman P. Willingham, Aransas Pass, Tex., assignor to F. K. Lytle, Aransas Pass, Tex.
Filed July 13, 1959, Ser. No. 826,647
10 Claims. (Cl. 43—9)

This invention relates to trawling gear, particularly of the type which is dragged along the bottom of a body of water for catching bottom dwelling creatures such as shrimp. The invention consists more particularly in novel construction and arrangement of the trawl net, itself, the otters doors for spreading the mouth of the net, the tow and drag lines extending from the boat to the otter doors and net, and the bag or cod portion of the net.

According to current practice, shrimp trawling nets consist of a very large forward portion of generally conical shape, having an open mouth defined by a top or cork line and a foot line or bottom cord. Drag lines extend from the corners of the net mouth to the otter doors which hold the mouth laterally open during trawling operations. Tow lines converge forwardly from the otter doors to a single line secured to the stern of the boat. The otter doors, conventionally, are simply large, flat, door-like structures which are secured to the tow and drag lines by bridles designed to maintain the doors at an angle of approximately 30° to the line of travel. Conventional otter doors for this purpose are approximately three feet high by eight feet long. Naturally, this type of door results in a rather low lift to drag ratio. Furthermore, the dragging of the door along the sea bottom stirs up the bottom so that clouds of mud are released. Moreover, in order to hold the net on the bottom, it is necessary to slightly incline the doors to vertical so that the hydro-dynamic forces urge them downwardly and this, of course, reduces the lift which can be obtained from the board for holding the net mouth open.

Another difficulty in the usual trawl net practice is that the entire load is carried through the otter doors to the net mouth. One result of this is that the doors must be made large enough so that the lateral hydro-dynamic force component on the door will balance the longitudinal drag component when the door is in the desired angular position. As the load increases or decreases, the incidence angle of the board decreases or increases, thus either reducing the lateral force holding the net mouth open or increasing the drag. Furthermore, the application of the entire load of the net to the netting of the forward portion thereof limits the load which can be handled without straining this portion of the net.

Still another disadvantage in current practice is that no means is provided for rejecting trash objects which are caught so that undesirable creatures, notably large loggerhead sponges, unnecessarily clog the net and reduce the profitable catch.

Accordingly, an important object of the present invention is to provide a novel otter door construction which materially increases the lift-drag ratio.

Another object is to provide an otter door which is much smaller and lighter than previous doors.

Another object is to provide an otter door construction having substantially greater stability than previous doors.

Another object is to provide an otter door construction having a broad, longitudinal runner or sled which may operate relatively smoothly along the seal bottom so as to provide a minimum of disturbance thereof.

Another object is to provide trawling gear, including otter doors, in which a major portion of the load is carried directly to the cod or collecting end of the net rather than through the otter doors and lighter mesh of the main net.

Another object is to provide trawling gear including otter doors in which the net may be maintained at the bottom of the sea by hydro-dynamic and gravity forces acting on the net, itself, or a fitting thereof and irrespective of the inclination of the otter doors.

Another object is to locate the forward end of the collecting bag or cod portion of the net relatively near the mouth of the net proper, and provide means on the forward end of the cod portion for disbursing the load substantially evenly therearound.

Another object is to provide a load carrying and disbursing construction of the forward end of the cod or bag portion of the net which embodies direction and level stabilizing means.

Another object is to provide a novel trash rejection means in conjunction with the net.

Another object is to provide improved net and chain fastening devices.

These objects, and other more detailed objects hereafter appearing are attained substantially by the devices and structures illustrated in the accompanying drawings in which FIG. 1 is a somewhat schematic side elevation showing the novel trawling gear;

FIG. 2 is a plan of the structure in FIG. 1;

FIG. 3 is an enlarged, isometric view showing one of the novel otter door devices;

FIG. 4 is a plan view of the structure in FIG. 3;

FIG. 5 is a disassembled view showing the novel load-carrying and disbursing construction at the forward end of the cod or collecting bag portion of the net;

FIG. 6 is an end elevation showing the device in FIG. 5;

FIG. 7 is an isometric view of the novel trash rejection construction incorporated in the net bag;

FIG. 8 is a perspective view showing the front end of the net with the otter boards omitted and parts broken away to clearly show the forwardly projecting top and bottom panels of the cod portion of the net.

FIGS. 1 and 2 are general views of the novel trawling gear, including the generally conical forward portion 12 of the net and the rearward collecting bag or cod portion 13 thereof which is of generally tubular construction and of substantially heavier, finer mesh than forward portion 12. Extending along the upper periphery of the mouth of the net is the head or cork line 14 which carries a plurality of floats 15 for vertically spreading the net mouth. The foot cable 16 extends from the forward, bottom corners of the net mouth to the corresponding corners of a novel load carrying and dispersing device, generally indicated at 17, which is secured to the forward extremity of the heavy bag netting. Details of device 17 are shown in FIGS. 5 and 6 to be described hereafter. It is noted that the heavier netting of the bag portion is extended approximately two-thirds of the distance from the apex 18 of the net to the mouth thereof. However, the sides of the bag portion 13 are omitted forwardly of apex 18, so that, in effect, only the top panel 19 and the corresponding bottom panel 19a of the bag overlap the conical main portion of the net. Thus, the conical interior of net portion 12 is continuous and unimpeded as is customary, except for structure 17.

Diverging bottom cords 20 of forward net portion 12 are continued forwardly as at 21, to form bottom drag lines for attachment to the rear lower corners of the otter doors, generally indicated at 22. Converging forwardly from the otter doors are tow lines 23 which merge at 24 with the main tow line 25 extending to the trawling boat. Also secured to main tow line 25 is a central tow line 26 which extends through a bridle 27 to the center of load attachment 17 previously mentioned.

FIGS. 3 and 4 illustrate in detail the novel otter door structures 22 which are reversed, but, otherwise identical.

At the bottom of each structure is a metal sheet 28 having an upwardly curved forward portion 29 and end and longitudinal framing pieces 30 and 31 forming a toboggan-shaped sled. Diagonally mounted on longitudinal rails 31 is the curved otter door sheet 32 which constitutes a nearly one-quarter section of the wall of an upright, hollow cylinder. The leading edge 33 of sheet 32 is, preferably, tangential to a plane paralleling the direction of movement of the device and, incidentally, the net through the water. Connecting the upper corners of sheet 32 is a chord bar 34 which is centrally provided with an eye 35 braced by a strut 36 for attachment to upper drag cord 37 which extends rearwardly to the adjacent, upper, forward corner of the net mouth. Also extending from the upper corners of the door sheet are framing bars 38 and 39, respectively, normal and parallel to the center line of sled 28, 29 and which are connected at their intersection by a vertical post 40 with top rail 31 opposite leading edge 33. A bracket 41 secured to post 40 provides for attachment of converging tow cable 23, 23a. If desired, cable 23 may be connected to the sled through a bridle extending from an eye 42 on the forward, inner corner of the sled and bracket 41 which may, in that case, be positioned higher on post 40.

In a practical embodiment as used with a standard commercial shrimping net, sled forming sheet 28, 29 is made of one-quarter inch sheet steel, eighteen inches wide by four feet long. The curved door sheet is constructed of one-quarter inch aluminum of such size and curvature that radial bars 38 and 39, respectively, are eighteen and twenty-four inches in length. Thus, approximately three-fourths of the weight of the device is incorporated in the sled at the bottom thereof so that the device has exceptional stability. Moreover, the total area of sheet 32 is only five and nine-tenths square feet, whereas present types of otter doors, as used with similar equipment, have an area of twenty-four square feet, more or less. Accordingly, the novel door is substantially smaller, lighter, less bulky and more stable than conventional otter doors. Nevertheless, the novel door design, being substantially more efficient in lift to drag ratio and used in connection with the novel tow and drag line arrangement, is able to control the net much more efficiently than previous doors. Another advantage of the novel otter door is that it is much less sensitive to variations in dragging velocity than are ordinary, flat doors.

It should be observed that with the leading edge of the curved door sheet trangential to a plane paralleling the direction of movement, the center of forces applied against the concave face of the sheet are eccentric, which has the effect of tending to rotate the sheet. This rotational force is translated through the drag lines to lateral forces tending to hold the net mouth open, while producing substantially less drag than conventional flat doors. In the assembly as shown, sled 28, 29 will move longitudinally along the sea bottom, thus eliminating the ploughing effect of prior doors, and, thereby, reducing the frictional drag, as well as the tendency to stir up the bottom.

FIG. 5 illustrates the novel center drag line attachment construction 17. This construction or device consists of top and bottom tanks 45 and 46 of streamline contour, as shown, and connected at their ends by vertical rudders 47 and 48. Filling openings in the ends of the tanks are provided with removable sealing caps 49, these filling openings permitting varying the weight of liquid ballast stored in the tanks and, therefore, the deadweight of the device tending to maintain it on the bottom. Other factors tending to maintain the device on the bottom are the inclination of the tanks, as determined by bridling 27, the shape of the tank surfaces, and the weight of the water on sled sheet 28. The structure, in the form of a rigid frame, is securely fastened to the forward extremities of top and bottom panels 19 of the net bag so as to evenly disburse center dragline forces along the edges of the heavier bag netting. Thus, a very large portion of the catch load is directly carried through device 17 and center line 26 to the main tow line, while the net moves along the sea bottom. The quantity of liquid ballast in the tanks 45 and 46, as well as the inclination of these tanks, may be adjusted to vary the depth of the net and its distance from the bottom.

FIG. 7 shows the novel trash rejection trap 55 which is secured in bag portion 13 of the net a short way rearwardly from net apex 18. This trap consists, essentially, of a rectangular bottom frame including longitudinal and transverse bars 56, 57 and 58, across which is secured a correspondingly shaped piece of canvas or other heavy, closely-woven cloth 59 which is longitudinally slit, as at 60, over a portion of its length. Sheet 59 fills an opening which is cut in bottom web 61 of the net bag portion. The periphery of this opening is, likewise, stitched to framing pieces 56, 57 and 58 so that the bottom of the bag web will be continuous, except for longitudinal slit 60. Canvas 59 is loosely fitted within framing 56-58 so that trapped objects may drop therethrough. However, during normal operation, sheet 59 will be held substantially horizontally with slit 60 closed by the pressure of the water.

At the rear of the trap device there are provided upstanding bars 62 and transverse and longitudinal pieces 63, 64 and 65, which form, with the adjacent portions of the bottom framing pieces, a box with open sides which snugly fits within the net bag, as indicated. Connecting transverse framing pieces 63 and 58 are a transversely arranged series of curved rigid bars or fingers 66 forming a lattice or open work and spaced apart a sufficient distance to permit the passage therethrough of the wanted catch, such as shrimp, while preventing the passage of larger, unwanted objects and creatures such as loggerhead sponges. These latter objects will be forced downwardly by the curved bars and thence out of the bag through slit 60.

Accordingly, I have provided novel trawling gear having numerous advantages over previous practice. The improved otter doors, in particular, are much less bulky yet more effective than previous doors, while the arrangement of drag lines is such as to protect the relatively weak netting of the forward portion of the net from a major portion of the load entrapped in the bag. Thus I am able to catch larger quantities of shrimp or other fish without unduly straining the net or forcing the otter doors inwardly in a manner to reduce the expense of the net mouth, as has been the case heretofore. Furthermore, I am able to use the novel trawling gear in substantially deeper waters than heretofore and without stirring up the bottom as has previous trawling equipment.

The invention may be modified in various respects as will occur to those skilled in the art and the exclusive use of all modifications as come within the scope of the appended claims is contemplated.

I claim:

1. Trawling gear comprising a net having a flared forward portion provided with an apex portion disposed rearwardly therefrom and a centered, generally tubular collecting part extending rearwardly from said apex portion and having top and bottom panels extending substantially forwardly of said apex portion, drag lines extending forwardly from the forward corners of said flared forward portion, otter doors secured to the forward ends of said drag lines, converging tow cables extending forwardly from said otter doors, and a center tow cable extending forwardly from the forward extremities of said top and bottom panels for carrying a substantial part of the load of said collecting part independently of said otter doors and said flared forward portion of the net.

2. Trawling equipment comprising a net having a flared, forward part of relatively light netting with an apex portion disposed rearwardly thereof and a generally tubular collecting portion of substantially heavier netting extending rearwardly from said apex portion and with at least one of its horizontal panels extending forwardly of said apex portion at least a major portion of the distance to the net mouth, reinforcing means at the forward edge of said extending panel, drag lines diverging forwardly from the sides of the net mouth, otter doors attached to the ends of said drag lines, converging tow lines extending forwardly from said otter doors, and a center tow line extending forwardly from said panel reinforcing means for carrying a substantial portion of the load for said collecting portion independently of said otter doors and the netting of said flared forward part of the net.

3. A trawling net comprising a flared forward portion formed of relatively light netting, an apex portion disposed rearwardly therefrom, and a generally tubular collecting portion extending rearwardly from said apex portion, said collecting portion having top and bottom panels extending forwardly of said apex portion at least a major portion of the distance to the net mouth, and a rigid frame structure secured to the forward extremities of said panels for attachment of a tow line.

4. A trawling net comprising a flared forward portion provided with an apex portion disposed rearwardly therefrom, a generally tubular collecting portion extending rearwardly from said apex portion, and a rigid frame structure secured to the forward extremity of said collecting portion, said structure having attachments for a tow cable and also having rudder-like portions for stabilizing the path of the net.

5. A trawling net as described in claim 4 in which said collecting portion has top and bottom panels which extend forwardly of said apex portion at least a major portion of the distance to the net mouth and said frame structure is secured to the forward extremities of said panels.

6. In a trawling net, a flared forward portion having an apex portion disposed rearwardly therefrom, a generally tubular collecting portion extending rearwardly from said apex portion, there being a restricted opening in the bottom panel of said collecting portion, and lattice structure depending from the top wall of said collecting portion toward said opening for directing objects entering said collecting portion but larger than the openings in said lattice structure downwardly through said opening.

7. In a trawling net, a flared forward portion having an apex portion disposed rearwardly therefrom and a generally tubular collecting portion extending rearwardly from said apex portion, there being a restricted opening in the bottom of said collecting portion, and an object rejecting trap device mounted in said collecting portion adjacent said opening and comprising framing received within the general contour of said collecting portion and with openings in its forward and bottom portions registering, respectively, with the opening through the interior of said collecting portion and the bottom opening therein, said framing further having lattice structure inclined downwardly and rearwardly from its upper portion and disposed to divert trash through the bottom openings in said framing and said collecting portions.

8. A trawling net for small fish, shrimp and the like, comprising a forward, mouth-forming portion and a rearwardly extending, generally tubular, collecting portion with a bottom panel having a restricted opening, and an object rejecting frame snugly received in said collecting portion adjacent said bottom opening, said frame having laterally spaced fingers secured to and extending downwardly and rearwardly from the upper part thereof above said opening for diverting through said opening objects too large to pass between said fingers.

9. A trawling net having a flared forward portion of relatively light netting with an apex portion disposed rearwardly therefrom, a generally tubular collecting portion extending rearwardly from said apex portion and of substantially heavier netting, said collecting portion having top and bottom panels extending forwardly of said apex portion at least a major portion of the distance to the net mouth, there being a restricted opening in said bottom panel, a rigid, cable attaching frame secured to the forward extremities of said panels, drag cables diverging forwardly from the sides of the net mouth, a skeletal frame snugly received in said collecting portion over said restricted opening, and laterally spaced fingers secured to and extending downwardly and rearwardly from the upper part of said frame to the vicinity of said opening for diverting therethrough objects entering said collecting portion but too large to pass between said fingers.

10. Trawling equipment as described in claim 9, further including otter doors secured to the forward extremities of said diverging draglines and a center tow line extending forwardly from said attaching frame.

References Cited in the file of this patent

UNITED STATES PATENTS

| 1,866,813 | Lindvall | July 12, 1932 |
| 2,231,869 | Andrews | Feb. 18, 1941 |
| 2,259,217 | Stevenson | Oct. 14, 1941 |
| 2,608,781 | Pierlot | Sept. 2, 1952 |
| 2,608,782 | Bottemanne | Sept. 2, 1952 |
| 2,618,879 | Lewis | Nov. 25, 1952 |
| 2,661,562 | Burney | Dec. 8, 1953 |
| 2,894,366 | Leckie | July 14, 1959 |

FOREIGN PATENTS

| 10,262 | Great Britain | 1911 |
| 648,089 | Great Britain | Dec. 28, 1950 |